United States Patent
Vu et al.

(10) Patent No.: US 9,685,678 B2
(45) Date of Patent: Jun. 20, 2017

(54) ELECTRODE MATERIALS WITH A SYNTHETIC SOLID ELECTROLYTE INTERFACE

(71) Applicant: A123 SYSTEMS, LLC, Waltham, MA (US)

(72) Inventors: Viet Vu, Canton, MI (US); Jinjun Shi, San Jose, CA (US); Pu Zhang, Ann Arbor, MI (US)

(73) Assignee: A123 Systems, LLC, Waltham, MA (US)

(*) Notice: Subject to any disclaimer, the term of this patent is extended or adjusted under 35 U.S.C. 154(b) by 0 days.

(21) Appl. No.: 14/765,808

(22) PCT Filed: Feb. 4, 2014

(86) PCT No.: PCT/US2014/014684
§ 371 (c)(1),
(2) Date: Aug. 4, 2015

(87) PCT Pub. No.: WO2014/123910
PCT Pub. Date: Aug. 14, 2014

(65) Prior Publication Data
US 2015/0364791 A1 Dec. 17, 2015

Related U.S. Application Data

(60) Provisional application No. 61/760,947, filed on Feb. 5, 2013.

(51) Int. Cl.
*H01M 10/0565* (2010.01)
*H01M 4/36* (2006.01)
(Continued)

(52) U.S. Cl.
CPC ....... *H01M 10/0565* (2013.01); *H01M 4/366* (2013.01); *H01M 4/386* (2013.01);
(Continued)

(58) Field of Classification Search
CPC ...... H01M 4/366; H01M 4/386; H01M 4/587; H01M 4/62; H01M 10/052; H01M 10/0562; H01M 10/0565; H01M 2300/0082
See application file for complete search history.

(56) References Cited

U.S. PATENT DOCUMENTS 6,235,427 B1 5/2001 Idota et al.
7,316,792 B2 1/2008 Kosuzu et al.
(Continued)

FOREIGN PATENT DOCUMENTS

JP    H1167215 A    3/1999
WO    2007015910 A1    2/2007

OTHER PUBLICATIONS

Herr, N. et al., "Hands-On Chemistry Activities with Real-Life Applications: Easy-to-Use Labs and Demonstrations for Grades 8-12," Unit 3.5.2: Cross-Linking Polymers, The Center for Applied Research in Education, May 24, 1999, 4 pages.
Chen, Z. et al., "Large-Volume-Change Electrodes for Li-ion Batteries of Amorphous Alloy Particles Held by Elastomeric Tethers," Electrochemistry Communications, vol. 5, No. 11, Oct. 2003, Published Online Sep. 13, 2003, 5 pages.
(Continued)

*Primary Examiner* — Brittany Raymond
(74) *Attorney, Agent, or Firm* — McCoy Russell LLP (57) ABSTRACT

A material suitable for use in an electrode, preferably an anode, and processes of its formation are provided. The material includes an electrode base material and an organic artificial solid electrolyte interface material including a water soluble organic polymer coating the electrode base material. The polymer is polymerized with a crosslinker to form the organic artificial solid electrolyte interface material. The resulting artificial SEI coated electrode material demonstrates superior discharge rate capacity and cycle stability.

27 Claims, 3 Drawing Sheets

(51) Int. Cl.
*H01M 4/38* (2006.01)
*H01M 4/587* (2010.01)
*H01M 4/62* (2006.01)
*H01M 10/052* (2010.01)
*H01M 10/0562* (2010.01)

(52) U.S. Cl.
CPC ............. *H01M 4/587* (2013.01); *H01M 4/62* (2013.01); *H01M 10/052* (2013.01); *H01M 10/0562* (2013.01); *H01M 2300/0082* (2013.01)

(56) References Cited

U.S. PATENT DOCUMENTS

| | | | |
|---|---|---|---|
| 2004/0214085 | A1 | 10/2004 | Sheem et al. |
| 2005/0282070 | A1 | 12/2005 | Doh et al. |
| 2006/0251561 | A1 | 11/2006 | Farrell et al. |
| 2007/0077490 | A1 | 4/2007 | Kim et al. |
| 2007/0190413 | A1 | 8/2007 | Lee et al. |
| 2007/0264568 | A1 | 11/2007 | Ryu et al. |
| 2009/0186267 | A1 | 7/2009 | Tiegs |
| 2009/0297948 | A1 | 12/2009 | Dahn et al. |
| 2010/0009267 | A1 | 1/2010 | Chase et al. |
| 2010/0297502 | A1 | 11/2010 | Zhu et al. |
| 2011/0117432 | A1* | 5/2011 | Kay .................... H01M 4/5825 429/218.1 |
| 2012/0088155 | A1* | 4/2012 | Yushin .................... H01M 2/16 429/217 |
| 2012/0183848 | A1* | 7/2012 | Kang .................... H01M 4/622 429/211 |

OTHER PUBLICATIONS

Shin, H. et al., "Porous Silicon Negative Electrodes for Rechargeable Lithium Batteries," Journal of Power Sources, vol. 139, No. 1-2, Jan. 4, 2005, Published Online Sep. 13, 2004, 7 pages.

"USABC Manuals," USCAR Website, Available Online at http://www.uscar.org/guest/article_view.php?articles_id=86, Available as Early as Jul. 12, 2007, 2 pages.

Menkin, S. et al., "Artificial Solid-Electrolyte Interphase (SEI) for Improved Cycleability and Safety of Lithium-Ion Cells for EV Applications," Electrochemistry Communications, vol. 11, No. 9, Sep. 2009, Published Online Aug. 4, 2009, 3 pages.

Li, J. et al., "Lithium Polyacrylate as a Binder for Tin-Cobalt-Carbon Negative Electrodes in Lithium-Ion Batteries," Electrochimica Acta, vol. 55, No. 8, Mar. 1, 2010, Published Online Jan. 15, 2010, 5 pages.

Magasinski, A. et al., "Toward Efficient Binders for Li-Ion Battery Si-Based Anodes: Polyacrylic Acid," ACS Applied Materials and Interfaces, vol. 2, No. 11, Nov. 2010, 7 pages.

Ji, G. et al., "Mitigating the Initial Capacity Loss (ICL) Problem in High-Capacity Lithium Ion Battery Anode Materials," Journal of Materials Chemistry, vol. 21, No. 27, Jul. 2011, Published Online Feb. 16, 2011, 6 pages.

Liu, Y. et al., "One-Pot Synthesis of Three-Dimensional Silver-Embedded Porous Silicon Micronparticles for Lithium-Ion Batteries," Journal of Materials Chemistry, vol. 21, No. 43, Nov. 2011, Published Online Oct. 7, 2011, 4 pages.

ISA United States Patent and Trademark Office, International Search Report Issued in Application No. PCT/US2014/014684, May 21, 2014, WIPO, 2 pages.

* cited by examiner

ELECTRODE MATERIALS WITH A SYNTHETIC SOLID ELECTROLYTE INTERFACE

CROSS REFERENCE TO RELATED APPLICATIONS

This application is a United States National Phase of International Patent Application No. PCT/US2014/014684, entitled "Electrode Materials With A Synthetic Solid Electrolyte Interface," filed Feb. 4, 2014, which claims priority to U.S. Provisional Patent Application No. 61/760,947, entitled "Electrode Materials With A Synthetic Solid Electrolyte Interface," filed Feb. 5, 2013, the entire contents of each of which are hereby incorporated by reference in their entirety for all purposes.

FIELD OF THE INVENTION

This invention relates generally to materials and methods for their fabrication. In particular, the invention relates to silicon based materials having utility as components of electrodes for electrochemical devices such as lithium batteries.

BACKGROUND

In the operation of a lithium ion battery, the anode takes up lithium ions from the cathode when the battery is being charged and releases those ions back to the cathode during discharge. One important parameter of the anode material is its capacity for retaining lithium ions, since this will directly impact the amount of charge that a given battery system can retain. Another important parameter is reversibility—the number of times the material can take up and release lithium ions without degradation or significant loss of capacity. This parameter will directly influence the service life of the battery system.

Lithium ion battery systems generally employ a carbonaceous anode due to the fact that it has very high reversibility and is quite safe. One problem with carbon materials is that their lithium ion capacity is only moderately high, hence, relatively large amounts of anode material must be employed in a given battery system. Silicon is capable of alloying with relatively large amounts of lithium and has a number of advantages as an anode material for lithium ion batteries. Typical carbon based anodes have discharge capacities of approximately 372 mAh/g while silicon has a theoretical capacity of 4200 mAh/g. Silicon, however, undergoes a relatively large volume change when lithium is incorporated therein. This volume change is very disadvantageous in most battery systems since it can cause a loss of capacity, decrease cycle life, and cause mechanical damage to the battery structure. Silicon expands volumetrically by up to 400% on full lithium insertion (lithiation), and it can contract significantly on lithium extraction (delithiation), creating two critical challenges: (1) minimizing the mechanical degradation of silicon structure in electrode and (2) maintaining the stability of the solid electrolyte interface (SEI). Stress induced by large changes in the volume of silicon anodes causes cracking and pulverization. Studies have shown these to be the main reasons for rapid capacity loss.

Tendency for fracture and decrepitation could be reduced or avoided by reducing the silicon particle size to the nanometer range. Indeed, the strain in such silicon nanostructures can be relaxed easily without mechanical structure, because of their small size and the available surrounding flee space. There has been some success in addressing the silicon material stability issues by designing nanostructured silicon materials including nanowires, nanotubes, nanoporous films and silicon nanoparticle/carbon composites. Some such approaches are disclosed in U.S. Patent Application Publications 2007/0077490, 2007/0190413 and 2005/0282070; U.S. Pat. No. 7,316,792, and published PCT Application WO 2007/015910.

However, SEI stability at the interface between the silicon and the liquid electrolyte is another critical factor in achieving a long cycle life. Even though the silicon mechanical fracture issues and decrepitation are largely overcome by using nanostructures, the interface with the electrolyte is not static due to their repetitive volume expansion and contraction. This represents a significant challenge that has not been effectively addressed for materials undergoing large volume changes.

Electrolyte decomposition occurs on the low potential anode and forms a passivating SEI layer on the silicon surface during battery charging. The SEI layer is an electronic insulator, but a lithium-ion conductor, so the growth of the SEI layer continues unabated on a freshly formed silicon surface resulting from silicon volume changes during cycling. Nano-scale structure has shown to minimize the stress induced mechanical breakdown, but could not address the SEI growth issue. Silicon expands upon lithiation, and then contacts during delithiation. This repetitive process causes cracks to form at the silicon surface. Even with the use of nano-structure the previously formed SEI can be broken during delithiation due to shrinking. The re-exposed fresh silicon surface to the electrolyte causes additional SEI to form resulting in thickening of the SEI with each charge/discharge cycle.

The thickening of the SEI results in a degradation of battery performance through: (1) the consumption of electrolyte and lithium ions during continuous SEI formation; (2) the electrically insulating nature of the SEI weakening the electrical contact between the current collector and anode material; (3) the long lithium diffusion distance through the thick SEI; and (4) electrode material degradation caused by mechanical stress from the thickening of SEI. The formation of a stable SEI is critical for realizing a long cycle life in silicon anodes. This also holds true generally for other electrode materials subject to large volume changes.

Despite the various efforts, the researchers have not been able to successfully utilize silicon based materials to prepare high capacity anode structures for lithium ion batteries that manifest high cycle lives. As will be explained in detail herein below, the present invention provides a pulverization resistant electrode material that is capable of alloying with large amounts of lithium ions and also retains this ability through a large number of charge/discharge cycles. The electrode materials of the present invention allow for the manufacture of high capacity lithium ion batteries that have superior cycle life. These and other advantages of the present invention will be apparent from the drawings, description and discussion which follow.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

The invention provide electrode materials with a polymerized coating forming an artificial SEI that is associated with the electrode material prior to its incorporation into an electrode (e.g. prior to combination with a binder or current collector) that significantly improves cycle life and other parameters of highly functional battery systems. An electrode material according to some embodiments of the invention includes an electrode base material, and an organic artificial solid electrolyte interface material comprising a water soluble organic polymer, the artificial solid electrolyte interface (SEI) forming a cross-linked polymeric coating, where the coating is polymerized upon said electrode base material. The artificial SEI optionally includes a polymer material a crosslinker that is polymerized with the polymer material. The crosslinker is optionally a metal ion or Lewis base. When a crosslinker is a metal ion, the metal is optionally boron, chromium, titanium, zirconium, or antimony. In some embodiments, a crosslinker is optionally lithium tetraborate. The artificial SEI optionally includes or is capable of absorbing an electrolyte solvent, optionally a carbonate electrolyte solvent. Independent of the type of crosslinker or electrode base material, a polymer is optionally PAA, PVA, or PMMA. In some embodiments, the water soluble organic polymer and the crosslinker are in a ratio of 4:1 to 1:1 respectively. Optionally, the artificial solid electrolyte interface material is present on the electrode base material at 0.05 percent to 5 percent total weight of the electrode material. Independent of the type of polymer or crosslinker, the electrode base material optionally includes a lithium inserting material. Optionally, an electrode base material includes silicon, graphitic carbon, a silicon/graphitic carbon composite, or combinations thereof, optionally a silicon composite of silicon and graphitic carbon, optionally a silicon-graphitic carbon composite nanowire. When an electrode base material includes a silicon-graphitic carbon composite nanowire, the nanowire is optionally coated with carbon intermediate between the nanowire and the artificial solid electrolyte interface material. Optionally, the resulting electrode material is suitable for use as an anode.

Also provided are processes for making an electrode material suitable for use in a secondary lithium ion battery. In some embodiments, a process includes: providing an electrode base material; combining the electrode base material with a polymer and a crosslinker in an aqueous solution at a ratio of polymer to crosslinker; and polymerizing the polymer and the crosslinker to form a polymeric artificial solid electrolyte interface material upon the electrode base material. The step of polymerizing is optionally at a temperature of 30 degrees Celsius to 70 degrees Celsius, optionally at a temperature 50 degrees Celsius. The step of polymerizing is for polymerization time, optionally of 5 minutes to 30 minutes, optionally 15 minutes. The artificial SEI optionally includes a polymer material a crosslinker that is polymerized with the polymer material. The crosslinker is optionally a metal ion or Lewis base. When a crosslinker is a metal ion, the metal is optionally boron, chromium, titanium, zirconium, or antimony. In some embodiments, a crosslinker is optionally lithium tetraborate. The artificial SEI optionally includes or is capable of absorbing an electrolyte solvent, optionally a carbonate electrolyte solvent. Independent of the type of crosslinker or electrode base material, a polymer is optionally PAA, PVA, or PMMA. In some embodiments, the water soluble organic polymer and the crosslinker are in a ratio of 4:1 to 1:1 respectively. Optionally, the artificial solid electrolyte interface material is present on the electrode base material at 0.05 percent to 5 percent total weight of the electrode material. Independent of the type of polymer or crosslinker, the electrode base material optionally includes a lithium inserting material. Optionally, an electrode base material includes silicon, graphitic carbon, a silicon/graphitic carbon composite, or combinations thereof, optionally a silicon composite of silicon and graphitic carbon, optionally a silicon-graphitic carbon composite nanowire. When an electrode base material includes a silicon-graphitic carbon composite nanowire, the nanowire is optionally coated with carbon intermediate between the nanowire and the artificial solid electrolyte interface material. Optionally, the resulting electrode material is suitable for use as an anode.

Also provided are batteries that include any of the aforementioned electrode materials, and optionally formed using any of the aforementioned processes.

DETAILED DESCRIPTION OF EMBODIMENTS OF THE INVENTION

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" intended to include the plural forms, including "at least one," unless the content clearly indicates otherwise. "Of" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

An electrode material is provided that has utility as an electrode or component in an electrochemical cell. The electrode material includes an electrode base material together with an organic artificial solid electrolyte interface (SEI). The resulting electrode materials of the present invention include a flexible coating of organic polymer with a crosslinker that when combined provides an artificial SEI that imparts greatly improved mechanical and dimensional stability to the underlying electrode base material when ions are taken up and released during the operation of a battery system.

The inventors surprisingly found that the presence of an organic artificial SEI coating reduces the electrolyte associated irreversible capacity loss (ICL) during the first charge by as much as 20% relative to the uncoated or prior electrolyte materials and also prevents the formation of new electrolyte formed SEI during cycling by acting as a physical barrier that both supports the structure of the underlying electrode base material as well as segregates it from direct contact with the electrolyte. An additional secondary advantage of the organic artificial SEI of the invention is a significant reduction in the amount of undesired gas phase byproduct that typically occurs with prior electrode materials.

An electrode material is optionally useful as a cathode or an anode in an electrochemical cell. An electrode includes an electrode base material. An electrode base material is optionally suitable for use in formation of an anode or a cathode. In some embodiments, an electrode base material optionally includes silicon, graphitic carbon, silicon carbon composites, tin, Ge, Sb, Al, Bi, As, Li metal, lithium alloys, metal alloys, transition metal oxides, nitride materials, sulfide materials, and combinations thereof. An alloy optionally includes one or more of Mg, Fe, Co, Ni, Ti, Mo, and W.

Illustrative examples of a metal alloy for use as an electrode material include silicon alloys. A silicon alloy is optionally and alloy of silicon and Ge, Be, Ag, Al, Au, Cd, Ga, In, Sb, Sn, Zn, or combinations thereof. The ratio of the alloying metal(s) to silicon is optionally 5% to 2000% by weight, optionally 5% to 500% by weight, optionally 20% to 60% by weight, based on silicon.

In some embodiments, an electrode base material includes a lithium alloy. A lithium alloy optionally includes any metal or alloy that alloys with lithium, illustratively including Al, Si, Sn, Ag, Bi, Mg, Zn, In, Ge, Pb, Pd, Pt, Sb, Ti, tin alloys, and silicon alloys.

Additional examples of alloys and methods of alloy production can be found in U.S. Pat. No. 6,235,427.

In some embodiments, the electrode base material is or includes: silicon; carbon and graphitic carbon materials such as natural graphite, graphene, artificial graphite, expanded graphite, carbon fibers, hard carbon, carbon black, carbon nanotubes, fullerenes and activated carbon; a composite material of a metal or metal compound and a carbon or graphite material whereby a metal optionally includes lithium and silicon; and a lithium-containing nitride. Optionally, an electrode base material is not graphite alone in the absence of silicon, lithium, or a metal. In particular embodiments, an electrode base material is a composite material of silicon and graphitic carbon that may or may not include a carbon coating and or thermal treatment to stabilize the adhesion of the coating to the surface. In some embodiments, an electrode base material includes a coating, illustratively a carbon coating. A carbon coating, when present, is positioned between the electrode base material and the artificial SEI as a component of an over coating upon the electrode base material. The pre-deposition of a carbon coating provides enhanced electronic conductivity and also adhesion of the ionic polymer coating deposited after. Traditional methods of carbon coating are applicable to the present invention such as by PVDP slurry casting illustratively by mixing 1-2% weight solution of PVDP dissolved in N-methyl-2-pyrrolidone (NMP) with an electrode base material to form the carbon coated electrode material. Similar processes of slurry casting can be used to achieve association of the artificial SEI with the coated or uncoated anode base material.

The electrode base material prior to and optionally following formation of the artificial SEI may be in any physical form such as a particulate (e.g. powder), nanowire, sheet, nanotube, nanofiber, porous structure, whisker, nanoplatelet, or other configuration known in the art.

An electrode base material may or may not be associated with a conductive substrate. When associated with a substrate, the substrate is optionally formed of any suitable electronically conductive and impermeable or substantially impermeable material, including, but not limited to, copper, stainless steel, titanium, or carbon papers/films, a non-perforated metal foil, aluminum foil, cladding material including nickel and aluminum, cladding material including copper and aluminum, nickel plated steel, nickel plated copper, nickel plated aluminum, gold, silver, any other suitable electronically conductive and impermeable material or any suitable combination thereof. In some embodiments, substrates may be formed of one or more suitable metals or combination of metals (e.g., alloys, solid solutions, plated metals). Optionally, an electrode base material is not associated with a substrate.

An electrode material includes an ion conducting organic artificial SEI that is layered upon or coated over an electrode base material. It is appreciated that the term "coats" is exclusive of the method a binder may surround an electrode base material. The present coating is a much different process than the way binder is combined with an electrode base material. Furthermore, the coated electrode material is preferably employed with a binder material when forming an electrode by processes readily understood in the art. Preferably, an organic artificial SEI entirely coats an electrode material. An artificial SEI is formed from an organic polymer or copolymer (collectively polymer as described herein) and a crosslinker that combine to form an ion conducting artificial SEI. An artificial SEI is optionally capable of conducting lithium ions through the polymer network. Without being bound to one particular theory, it is believed that ion conduction occurs via a tunneling mechanism mediated by migration between coordination sites repeatedly generated by the local motion of polymer chain segments. In some embodiments, an organic polymer is water soluble at temperatures above 50° C. An artificial SEI in some embodiments is capable of absorbing common electrolytes including carbonate based electrolytes. Illustrative examples of a polymer material used in an artificial SEI include polyvinyl alcohol (PVA), polyacrylic acid (PAA), and polymethyl methacrylate (PMMA), or combinations thereof. Illustratively a polymer or copolymer that form a component of an artificial SEI has a molecular weight of 10,000 Daltons or higher. Such polymers and copolymers (collectively "polymers"), optionally those containing PVA, PAA, or PMMA, are commercially available. The commercially available PVA polymers and copolymers may have varying degrees of hydrolysis of vinyl acetate. The polymers or copolymers optionally have a high polymerization degree, optionally of more than 3000. An electrode material optionally excludes materials other than an electrode base material, polymer, and crosslinker.

A polymer is appreciated to be capable of associating with a crosslinker material to form an artificial SEI suitable for associating, optionally coating, optionally entirely coating, an electrode base material. The crosslinker is used to crosslink the polymer to form an organic polymeric artificial SEI coating material that forms an outer coating on an electrode base material, optionally directly on an electrode base material. A key innovative aspect of the artificial SEI is to use the organic polymer with a composition and in a conformation that supports lithium ion transport in a mechanism analogous to PEO, but not to the exclusion of liquid electrolyte that sustains high ion transport rate. In an exemplary system an organic polymer is used to form an artificial SEI essentially as follows:

A crosslinker optionally includes a metal or Lewis base. In some embodiments, a crosslinker includes boron, chromium, titanium, zirconium, antimony, or combinations thereof. In some embodiments, a crosslinker is lithium tetra borate ($Li_2B_4O_7$) (LTB).

It was found that the presence of an artificial SEI on an electrode base material where the artificial SEI includes an organic polymer and crosslinker provides increased cycle life and reduces rate of capacity fade relative to the uncoated electrode base material or other artificial SEI types. A coating of an artificial SEI is able to absorb one or more electrolyte materials. This artificial SEI optionally has a density of 1.2 to 1.6 g/cc that will facilitate lithium ion transport as one property of the artificial SEI.

The polymer and crosslinker are optionally present in a ratio of 4:1 to 1:1 respectively. Optionally, a ratio is 4:1, 3:1, 2:1, or 1:1. In some embodiments a ratio of polymer to crosslinker is any value or range from 4:1 to 1:1. Optionally, a ratio of polymer and crosslinker does not exceed 5:1 or is not lower than 1:1.

The amount of the artificial SEI material is optionally from 0.05% to 5% of the total weight of the electrode base material, or any value or range therebetween. Optionally, the amount of the artificial SEI material coating does not exceed 5% by weight. An artificial SEI optionally has a thickness that is less than 1 μm, optionally less than 100 nm, optionally less than 10 nm, optionally less than 5 nm, optionally 0.01 to 3 nm thick. In some embodiments, an artificial SEI has a thickness that does not exceed 2 nm, optionally does not exceed 5 nm. A thickness or relative weight percent of the artificial SEI is optionally unsuitable for use as a binder.

Specifically, the electrode material may be used in an electrode for a secondary battery. An electrode is optionally fabricated by suspending a coated electrode material and a binder (optionally at 1-10% by weight of solvent) in a solvent to prepare a slurry, and applying the resulting slurry to a current collector, followed by drying and optionally pressing. Exemplary binders include PVdF binder solutions in NMP or aqueous polyolefin latex suspensions. Examples of the solvent used in preparation of the electrode may include, but are not limited to carbonate-based, ester-based, ether-based, ketone-based, alcohol-based, or aprotic solvents. Specific organic solvents such as dimethyl sulfoxide (DMSO), N-methyl pyrrolidone (NMP) and ethylene glycol, and distilled water may be used. Such solvents are known in the art.

The organic artificial SEI retains structural stability in electrolyte without dissolution or decomposition. Non-crosslinked PVA with low degree of polymerization (DP), for example, may dissolve in the electrolyte during long term cycling (Japanese Patent Laid-open Publication No. Hei 11-67215). Non-crosslinked PVA with high DP is stable in the electrolyte but has very low solubility in water that makes it very difficult to be used as an aqueous binder. In contrast to these prior systems, the inventive artificial SEI uses in situ crosslinked PVA that has the same solvent resistance as the PVA with high DP, while being processible as an aqueous solution. Testing of the inventive artificial SEI shows no dissolution of a crosslinked PVA film after 7 days soaking in a Li ion electrolyte at 60° C.

In addition, thermal and mechanical stability is important for an artificial SEI coating for two reasons: (1) there are several heat treatment steps typically ranging from 60° C. to 150° C. required during electrode coating and cell assembly operations; and (2) Li ion batteries reach elevated temperatures under high power or abusive operating conditions. The inventive artificial SEI is chemically and physically stable at such conditions. The fully hydrolyzed PVA has a much higher glass transition temperature ($T_g$=85° C.) and melting point ($T_m$=230° C.) than conventional similar materials used as binders such as PVdF and SBR.

Also provided are processes of forming an electrode material, optionally an anode, of an electrode base material as described herein coated with an organic artificial SEI. A process includes providing an electrode base material. The artificial SEI material is formed by placing a desired polymer in an aqueous medium that is then combined with an aqueous solution of crosslinker at a desired ratio. A ratio is any ratio as described herein. The electrode base material is optionally immersed in the solution of the polymer and crosslinker whereby the polymer and crosslinker coats the electrode base material during polymerization to form an artificial SEI coated electrode base material. The coating is optionally done at elevated temperatures optionally from 30° C. to 70° C. or any value or range therebetween to enhance the mobility and accessibility of polymer to the surface of to be coated material. Optionally, the coating is done at 50° C. A coating time is used that is optionally between 5 to 90 minutes, or any value or range therebetween, optionally 15 minutes. A coating time is optionally adjusted to control the resulting thickness of the artificial SEI.

Subsequent processing steps of the coated electrode base material are optionally included, illustratively filtration and rinsing to remove unattached material. The coated electrode base material is optionally dried, illustratively for subsequent use in an electrochemical cell.

An electrochemical cell is also provided that uses an electrode formed of an electrode base material coated with an artificial SEI substantially as provided by the invention with embodiments as described herein. The electrode base material is optionally used alone or is associated with a substrate material.

An electrochemical cell optionally further includes an opposing electrode, optionally a cathode. A cathode is optionally formed of any suitable material known in the art. It is appreciated that a cathode optionally also includes an artificial SEI. Examples an active material for use in a cathode include layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; Ni-site type lithiated nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is subsisted with alkaline earth metal ions; disulfide compounds; and $Fe_2(MoO_4)_3$; $LiFe_3O_4$, etc.

An electrochemical cell includes an electrolyte. An electrolyte is optionally a solid or fluid electrolyte. Illustratively, the electrolyte includes a lithium salt and a non-aqueous organic solvent. A lithium salt is optionally $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, LiCl, LiI, or $LiB(C_2O_4)_2$ (lithium bis(oxalato) borate; LiBOB). The lithium salt is optionally present in a concentration ranging from about 0.1 M to about 2.0 M. When the lithium salt is included at the above concentration range, an electrolyte may have excellent performance and lithium ion mobility due to optimal electrolyte conductivity and viscosity.

The resulting artificial SEI associated electrode base materials are suitable as anode or cathode material for inclusion in an electrochemical cell. Among the many advantages of the artificial SEI coated electrode base materials, the resulting electrode material is resistant to physical degradation that is common of silicon based materials when cycling with lithium thereby increasing cycle life and reducing the rate of capacity fade.

Various aspects of the present invention are illustrated by the following non-limiting examples. The examples are for illustrative purposes and are not a limitation on any practice of the present invention. It will be understood that variations and modifications can be made without departing from the spirit and scope of the invention. While the examples are generally directed to silicon particulate as an electrode base material, it is understood that other electrode base materials are similarly used. Reagents illustrated herein are commercially available, and a person of ordinary skill in the art readily understands where such reagents may be obtained.

EXPERIMENTAL

A graphite/Si nanowire composite electrode material (with 8-16% Si content) is coated with crosslinked PVA/lithium tetraborate (LTB) as follows:

1. dissolve PVA powder in hot water to prepare PVA solution with certain PVA concentration as defined in Table 1—the viscosity of the suspension is low because the PVA binder is not crosslinked at this point;
2. dissolve lithium tetraborate (LTB) ($Li_2B_4O_7$) in hot water to prepare borate solution with certain borate concentration as defined in Table 1;
3. mix PVA solution and borate solution with certain weight ratio (illustratively 4:1 to 1:1);
4. add anode powder (graphite/Si nanowire composite from Nanosys) to the mixture of PVA and borate, then vigorously stir for 15 min at 50° C.;
5. vacuum filter the anode/PVA/borate suspension and rinse with DI water 3 times;
6. vacuum dry the filtrated powder at about 100° C.;
7. sieve the powder.

Vacuum drying is one way to form the protective layer on the electrode base material powder, while other standard powder drying procedures such as spray dry and freeze dry may also be used for this purpose. Different combinations of reactant concentration and weight, together with a suitable drying method will define the final loading of the protective layer. The starting baseline formulation/conditions is 50 grams of electrode material placed in 100 mL of an aqueous 2% solution of PVA (final ration active/PVA of ~20:1), 35% solid content of the suspension, 4% crosslinker solution, 4:1 of PVA to crosslinker, and 25° C., respectively. The ideal loading level of the protective layer is 0.05%-5% of the total powder weight when used with the graphite/Si nanowire composite from Nanosys.

The following electrode materials are formed substantially as in the above process with additional specifics or alterations as in Table 1.

TABLE 1

| Sample # | PVA concentration | Borate concentration | PVA/borate volume ratio | PVA/borate wt. ratio | Notes |
| --- | --- | --- | --- | --- | --- |
| 1 | 1.3% | 4% | — | | |
| 2 | 4% | 4% | — | | |
| 3 | 2% | 2% | 4:1 | 4:1 | Mix PVA and borate first, then add Nanosys, room T |

TABLE 1-continued

| Sample # | PVA concentration | Borate concentration | PVA/borate volume ratio | PVA/borate wt. ratio | Notes |
|---|---|---|---|---|---|
| 4 | 2% | 2% | 4:1 | 4:1 | Mix PVA and Nanosys first, then add borate, room T |
| 5 | 1% | 1% | 1:1 | 1:1 | Mixed at 50 C. for 15 min |
| 6 | 2% | 2% | 1:1 | 1:1 | Mixed at 50 C. for 15 min |
| 7 | 2% | 4% | 1:1 | 1:2 | Mixed at 50 C. for 15 min |
| 8 | 1% | 1% | 1:1 | 1:1 | Same as 5, but repeat the coating process 3 times |
| 9 | 2% | 2% | 3:1 | 3:1 | 50 C. reaction |
| 10 | 2% | 2% | 2:1 | 2:1 | 50 C. reaction |

The coated anode powder is suitable for combination with binders in both a non-aqueous slurry with NMP/PVDF and aqueous slurry with CMC/SBR.

The coated anode powders are used in the formation of anodes for test cells. To prepare an active material slurry to form the anode, a Flacktec SpeedMixer is used to mix the active slurry (coated active material and water) and doctor blades are used to hand-cast the electrode. Once the active material has been coated on the conductive substrate, it is compressed to desired porosity, generally in 35-40% range for relatively thick loading. The slurry viscosity and stability are checked by a Rheometer. The electrode adhesion is tested in both dry and wet states. The electrode surface and cross section are tested by SEM and Optical Microscope for its uniformities including uniform dispersion of electrode components (i.e., active, conductive carbon, and binder) and thickness/porosity uniformity. The slurry is mixed in a temperature and pressure controlled high shear double planetary mixer in the scale of 2-5 kg. Electrodes are coated using a Toyo Systems 150 WI slot-die coater which is capable of 150 mm wide coatings, and supports two-sided, sequential, or intermittent electrode deposition. IRM Model 200 heated-roll calendaring presses are used to calendar the electrode to design porosity.

The electrode is qualified for its adhesion and flexibility by using standard procedures in production:

Mandrel Test: The test unit is set up by placing a mandrel bar (size from 1.0 mm to 4.0 mm) between two rollers. An electrode sample is slit to 4 inches long. It is held with two hands on each end. The sample is rolled back and forth over mandrel bar 5 or 6 times. The coating surface and dry adhesion are graded on 1-4 scale according to standard operating procedure.

Hot Electrolyte Test: Three pieces of 1 inch×1 inch electrode are soaked in electrolyte at 85° C. for 2 hours. When it is cool, the electrode is blotted dry with a paper towel. On patted-dry electrodes, the operator takes the end of razor blade and gently scrapes the electrode. The wet adhesion is graded on 1-4 scale according to standard operating procedure.

Each coated material containing anode is tested in both half and full cell format. Electrode formulation and structure are validated in coin half cells and Li ion pouch cells (~250 mAh). Illustratively, the above coated electrode materials are used as an electrode in coin cells assembled in an Ar-filled box using a lithium nickel cobalt manganese oxide (LNCM) cathode to match coated silicon anode in the Li ion cells. In a first series of tests, coin cells were prepared that used an electrolyte comprising 1 molar $LiPF_6$ in a 1:1:1 mixture of EC:DMC:DEC.

Cell capacity and energy at low C-rate (C/10) are tested on Maccor. Three cells are tested for reproducibility. The specific energy (Wh/kg) is calculated based on the voltage, current, and time of the charge/discharge curves, and weight of the Li-ion cell. The results are compared with the calculated values. The C/10 capacity and energy are used as the baseline for rate capability and cycle life tests.

Both charge and discharge capacity are measured at several different C-rates (C/10, C/5, C/2, 1C, 2C, 5C, 10C and 30C) to evaluate the rate capability. The discharge capacity retention at different C-rates are calculated from the cell capacity at the specific C-rate against that at C/10.

The coated electrode materials show an increase in first cycle coulombic efficiency and lower irreversible capacity loss (ICL) following the formation cycle as shown in Table 2: The coulombic efficiency increases for both electrodes using CMC or PVDF as binders.

TABLE 2

| | | | | | | | Sample 8 | | Sample 9 | |
|---|---|---|---|---|---|---|---|---|---|---|
| | Baseline | Sample 3 | Sample 4 | Sample 5 | Sample 6 | Sample 7 | CMC | PDVF | CMC | PDVF |
| Avg ICL (%) | 9.12 | 8.06 | 7.94 | 7.64 | 7.72 | 7.92 | 8.55 | 8.55 | 7.97 | 8.28 |

These data illustrate a dramatic and previously unachievable reduction in ICL of nearly 20%.

Figure 1A:
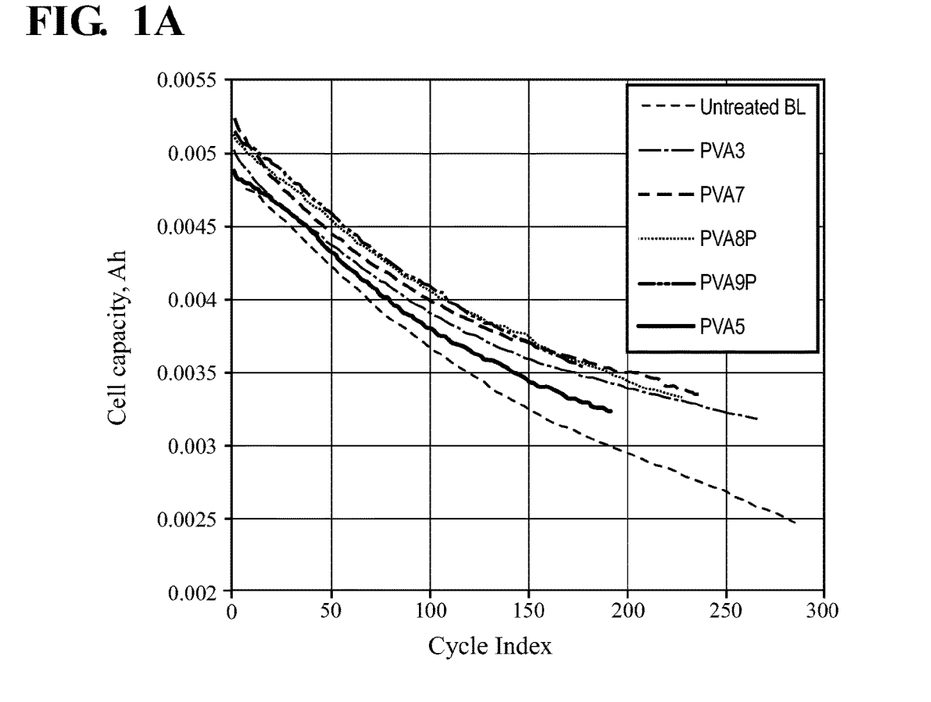
FIG. 1A illustrates the cycle life in coin cells employing control or artificial SEI coated electrode material according to one embodiment.

The coin cells were cycled over a voltage of 0.01-0.7V, and the Li ion cell voltage is 3.0-4.3V and the reversible storage capacity in terms of Ah is plotted against cycle number. Cell cycle life is evaluated at room temperature at a +0.5C/−0.5C rate. A cycle life of >300 cycles at 100% depth of discharge (DOD) is demonstrated in a Li ion cell with capacity of >200 mAh. The data from this experimental series is summarized in FIG. 1A illustrating that cells incorporating this material exhibit excellent cycle stability for over 250 cycles.

Figure 1B:
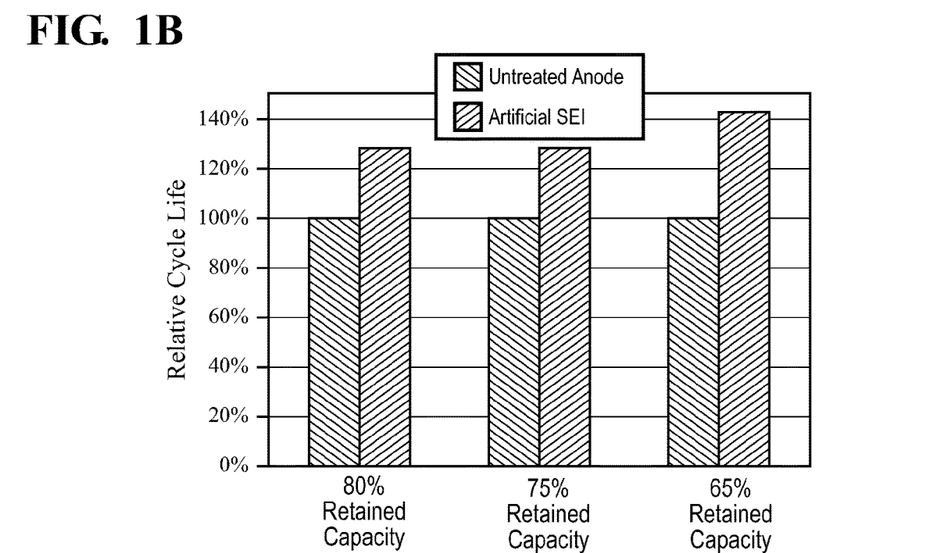
FIG. 1B illustrates artificial SEI coated electrode material containing cells according to one embodiment show at least 25% cycle life improvement (between 26% and 42% improved)

Deep discharge cycling of the test cells (0.5C/−0.5C) is also performed. The artificial SEI coated electrode material containing cells show at least 25% cycle life improvement (between 26% and 42% improved) relative retained cycle life at the same retained capacities with greater improvements observed at lower retained capacity (FIG. 1B).

Figure 2A:
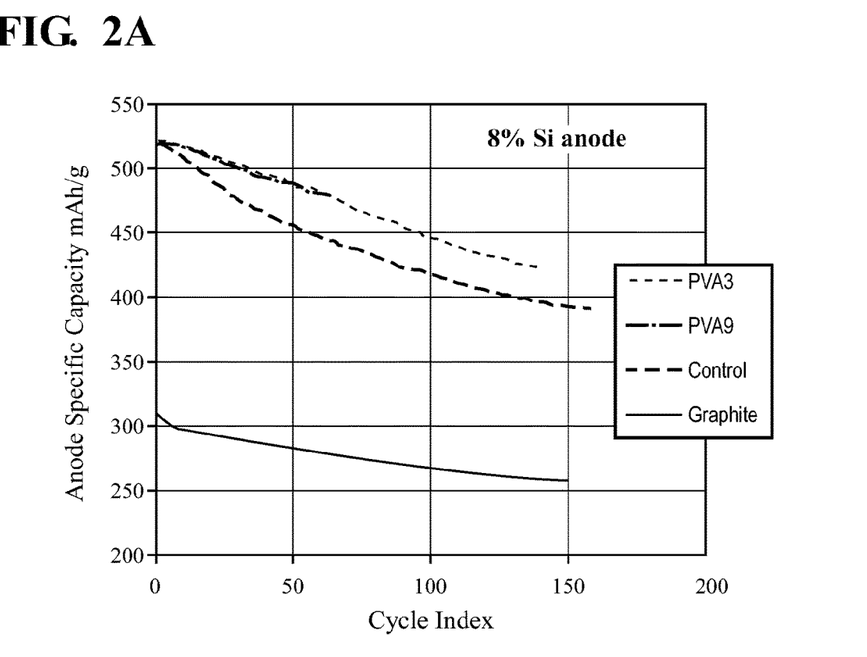
FIG. 2A: illustrates the maintenance of specific capacity in a pouch cell employing a control or PVA coated 8% SiNW composite electrode material.
Figure 2B:
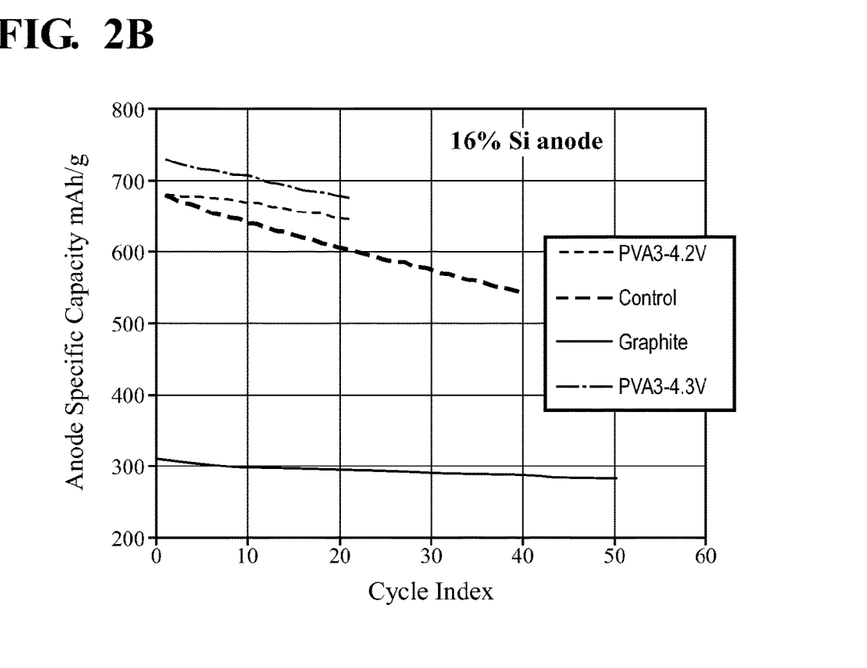
FIG. 2B illustrates the maintenance of specific capacity in a pouch cell employing a control or PVA coated 16% SiNW composite electrode material.
Figure 3:
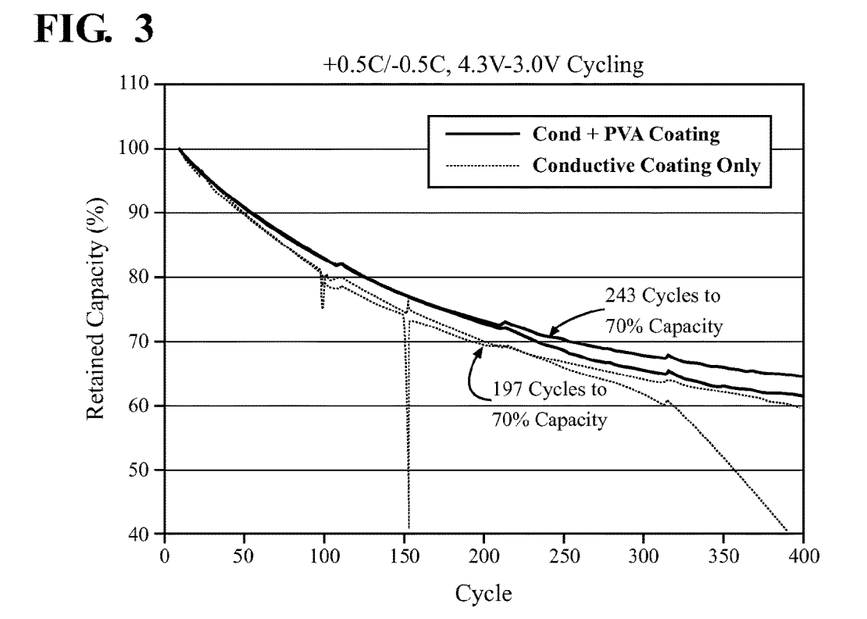
FIG. 3 illustrates improved cycle life of a pouch cell incorporating coated electrode base material according to one embodiment.

The artificial SEI coated electrode materials of Table 1 are incorporated into anodes and tested in pouch cells. These cells were cycled between 4.3V to 3V and 4.2V to 3V for electrodes with different silicon ratio. FIGS. 2-3 illustrate the reversible anode storage capacity in terms of mAh/g plotted against the cycle number versus state of the art graphite anode and untreated silicon composite. Using an 8% silicon anode, specific capacity is dramatically improved relative to the uncoated anode material (control) that is maintained to at least 150 cycles (FIG. 2A). Similarly, using a 16% silicon anode the artificial SEI coated electrode materials show excellent improvement (FIG. 2B).

These pouch cells also show excellent cycle life. As is illustrated in FIG. 3, cells incorporating uncoated anode active material show a reduction in capacity of 70% at 197 cycles. Test cells incorporating coated silicon active material into the anode maintains greater than 70% capacity out to 243 cycles.

Figure 4:
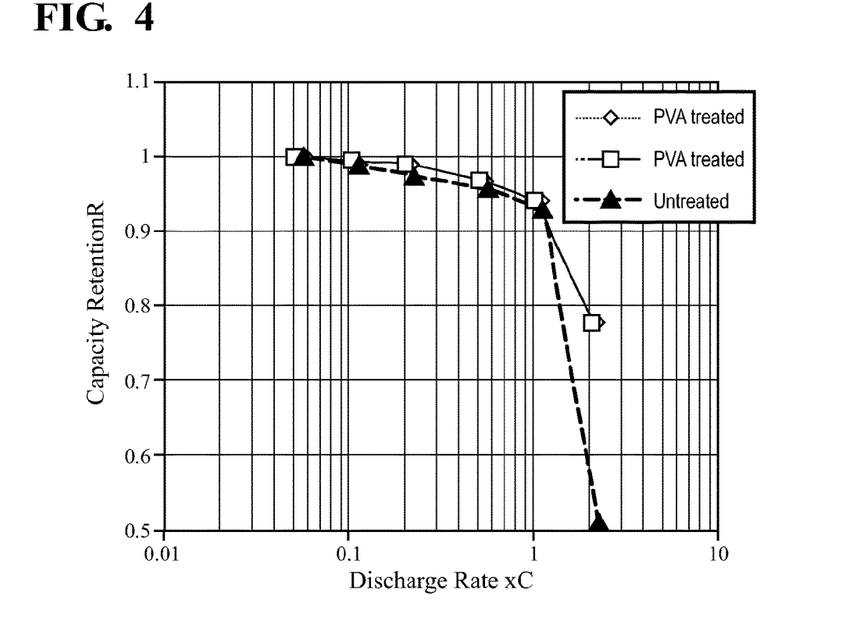
FIG. 4 illustrates improved capacity retention in cells using artificial SEI coated electrode material according to one embodiment in an anode.

Discharge rate capacity is also determined using the pouch cells as above. The discharge rate capacity is greatly improved by the PVA/LTB coated anode base materials as is illustrated in FIG. 4.

Similar results are anticipated utilizing composite materials of silicon/graphite, carbon coated silicon or carbon coated silicon/graphite, as well as graphitic carbon based anode materials.

LISTING OF ELEMENTS

Element 1: An electrode material comprising: an electrode base material; and an organic artificial solid electrolyte interface material comprising a water soluble organic polymer; said artificial solid electrolyte interface forming a cross-linked polymeric coating, said coating polymerized upon said electrode base material.

Element 2: The material of element 1 wherein said artificial solid electrolyte interface further comprises a crosslinker.

Element 3: The material of element 2 wherein said crosslinker comprises a metal ion or Lewis base.

Element 4: The material of element 3 wherein said metal ion is boron, chromium, titanium, zirconium, or antimony.

Element 5: The material of element 2 wherein said crosslinker is lithium tetraborate.

Element 6: The material of any one of elements 1-5 wherein said organic artificial solid electrolyte interface further includes or is capable of absorbing an electrolyte solvent, optionally a carbonate electrolyte solvent.

Element 7: The material of any one of elements 1-5 wherein said water soluble organic polymer is PAA, PVA, or PMMA.

Element 8: The material of any one of elements 2-5 wherein said water soluble organic polymer and said cross-linker are in a ratio of 4:1 to 1:1 respectively.

Element 9: The material of any one of elements 1-5 wherein said artificial solid electrolyte interface material is present on said electrode base material at 0.05 percent to 5 percent total weight of said electrode material.

Element 10: The material of any one of elements 1-5 wherein said electrode base material comprises a lithium inserting material.

Element 11: The material of any one of elements 1-5 wherein said electrode material comprises silicon, graphitic carbon, a silicon/graphitic carbon composite, or combinations thereof.

Element 12: The material of element 11 wherein said electrode base material is a silicon composite of silicon and graphitic carbon.

Element 13: The material of any one of elements 1-5 wherein said electrode base material is a silicon-graphitic carbon composite nanowire.

Element 14: The material of element 13 wherein said nanowire is coated with carbon intermediate between said nanowire and said artificial solid electrolyte interface material.

Element 15: The material of any one of elements 1-5 wherein said electrode base material is suitable for use as an anode in an electrochemical cell.

Element 16: A process for making an electrode for an electrochemical device, said method comprising the steps of: providing an electrode base material; combining said electrode base material with a polymer and a crosslinker in an aqueous solution at a ratio of polymer to crosslinker; and polymerizing said polymer and said crosslinker to form a polymeric artificial solid electrolyte interface material upon said electrode base material.

Element 17: The process of element 16 wherein said step of polymerizing is at a temperature of 30 degrees Celsius to 70 degrees Celsius.

Element 18: The process of element 16 wherein said step of polymerizing is at a temperature of 50 degrees Celsius.

Element 19: The process of element 16 wherein said step of polymerizing is for polymerization time of 5 minutes to 30 minutes.

Element 20: The process of element 19 wherein said polymerization time is 15 minutes.

Element 21: The process of any one of elements 16-20 wherein said polymer and said cross-linker are in a ratio of 4:1 to 1:1 respectively.

Element 22: The process of any one of elements 16-20 wherein said electrode base material is a silicon composite of silicon and graphitic carbon.

Element 23: The process of any one of elements 16-20 wherein said electrode base material is a silicon-graphitic carbon composite nanowire.

Element 24: The process of element 23 wherein said nanowire is coated with carbon intermediate between said electrode base material and said artificial solid electrolyte interface material.

Element 25: The process of any one of elements 16-20 wherein said electrode comprises the material of any one of claims 1-5.

Element 26: A battery comprising: the electrode material of any of claims 1-5; an electrolyte; and a container housing both said electrode material and said electrolyte.

Element 27: The battery of element 26 wherein said electrolyte is a carbonate electrolyte.

Element 28: The battery of element 26 with an electrode material of any one or more of elements 1-15.

Element 29: The electrode material of elements 1, 2, or 3 with any one or more of elements 4-15.

Element 30: The electrode material of element 1 in combination with elements 4,5, or 7-15.

Element 31: The electrode material of element 7 with any one or more of elements 8-15.

Element 32: The electrode material of element 8 with any one or more of elements 9-15.

Element 33: The electrode material of element 9 with any one or more of elements 10-15.

Element 34: The electrode material of element 10 with any one or more of elements 11-15.

Element 35: The electrode material of element 11 with any one or more of elements 12-15.

Element 36: The electrode material of element 13 with any one or more of elements 14-15.

Element 37: The electrode material of element 15 with any one or more of elements 6-14.

Element 38: The process of element 16 to form the electrode of any one or more of elements 1-15.

Element 39: The process of element 17 with any one or more of elements 18-25.

Element 40: The process of element 18 with any one or more of elements 19-25.

Element 41: The process of element 19 with any one or more of elements 17-18, or 20-25.

Element 42: The process of element 20 with any one or more of elements 17-18, or 21-25.

Element 43: The process of element 21 with any one or more of elements 22-25.

Element 44: The process of element 22 with any one or more of elements 23-25.

Element 45: The process of element 23 with any one or more of element 25.

Element 46: The battery of element 26 including the electrode material of any one or more of elements 1-15 or 29-37.

Element 46: The battery of element 26 including an electrode material formed by a process of any one or more of elements 16-25 or 38-45.

The battery of element 27 including the electrode material of any one more of elements 1-15 or 29-37.

The battery of element 27 including an electrode material formed by a process of any one or more of elements 16-25 or 38-45.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The Invention claimed is:

1. An electrode material comprising:
   an electrode base material; and
   an organic artificial solid electrolyte interface material comprising a water soluble organic polymer;
   said artificial solid electrolyte interface material forming a cross-linked polymeric coating, said coating polymerized upon said electrode base material,
   said polymeric coating formed prior to combining said electrode base material with a binder or a current collector.

2. The electrode material of claim 1, wherein said artificial solid electrolyte interface material further comprises a crosslinker.

3. The electrode material of claim 2, wherein said crosslinker comprises a metal ion or Lewis base.

4. The electrode material of claim 3, wherein said metal ion is boron, chromium, titanium, zirconium, or antimony.

5. The electrode material of claim 2, wherein said crosslinker is lithium tetraborate.

6. The electrode material of claim 2, wherein said water soluble organic polymer and said crosslinker are in a ratio of 4:1 to 1:1 respectively.

7. The electrode material of claim 1, wherein said organic artificial solid electrolyte interface material further includes or is capable of absorbing an electrolyte solvent, optionally a carbonate electrolyte solvent.

8. The electrode material of claim 1, wherein said water soluble organic polymer is PAA, PVA, or PMMA.

9. The electrode material of claim 1, wherein said artificial solid electrolyte interface material is present on said electrode base material at 0.05 percent to 5 percent total weight of said electrode material.

10. The electrode material of claim 1, wherein said electrode base material comprises a lithium inserting material.

11. The electrode material of claim 1, wherein said electrode material comprises silicon, graphitic carbon, a silicon/graphitic carbon composite, or combinations thereof.

12. The electrode material of claim 11, wherein said electrode base material is a silicon composite of silicon and graphitic carbon.

13. The electrode material of claim 1, wherein said electrode base material is a silicon-graphitic carbon composite nanowire.

14. The electrode material of claim 13, wherein said nanowire is coated with carbon intermediate between said nanowire and said artificial solid electrolyte interface material.

15. The electrode material of claim 1, wherein said electrode base material is suitable for use as an anode in an electrochemical cell.

16. A process for making an electrode for an electrochemical device, said process comprising the steps of:
    providing an electrode base material;
    combining said electrode base material with a polymer and a crosslinker in an aqueous solution at a ratio of polymer to crosslinker; and
    polymerizing said polymer and said crosslinker to form a polymeric artificial solid electrolyte interface material upon said electrode base material,
    said polymeric artificial solid electrolyte interface material formed prior to combining said electrode base material with a binder or a current collector.

17. The process of claim 16, wherein said step of polymerizing is at a temperature of 30 degrees Celsius to 70 degrees Celsius.

18. The process of claim 16, wherein said step of polymerizing is at a temperature of 50 degrees Celsius.

19. The process of claim 16, wherein said step of polymerizing is for polymerization time of 5 minutes to 30 minutes.

20. The process of claim 19, wherein said polymerization time is 15 minutes.

21. The process of claim 16, wherein said polymer and said Cross linker are in a ratio of 4:1 to 1:1 respectively.

22. The process of claim 16, wherein said electrode base material is a silicon composite of silicon and graphitic carbon.

23. The process of claim 16, wherein said electrode base material is a silicon-graphitic carbon composite nanowire.

24. The process of claim 23, wherein said nanowire is coated with carbon intermediate between said electrode base material and said artificial solid electrolyte interface material.

25. A battery comprising:
    an electrode material comprising an electrode base material together with an organic artificial solid electrolyte interface, the organic artificial solid electrolyte interface coated over the electrode base material to form a cross-linked polymeric coating prior to combining said electrode base material with a binder or a current collector;
    an electrolyte; and
    a container housing both said electrode material and said electrolyte.

26. The battery of claim 25, wherein said electrolyte is a carbonate electrolyte.

27. The battery of claim 25, further comprising an anode formed from the electrode material.

* * * * *